(12) United States Patent
Carter

(10) Patent No.: US 9,639,512 B1
(45) Date of Patent: May 2, 2017

(54) APPARATUS AND METHOD FOR SHARING REGIONAL ANNOTATIONS OF AN IMAGE

(71) Applicant: Nicholas M. Carter, St. Peters, MO (US)

(72) Inventor: Nicholas M. Carter, St. Peters, MO (US)

(*) Notice: Subject to any disclaimer, the term of this patent is extended or adjusted under 35 U.S.C. 154(b) by 20 days.

(21) Appl. No.: 14/549,399

(22) Filed: Nov. 20, 2014

(51) Int. Cl.
*G06F 17/00* (2006.01)
*G06F 17/24* (2006.01)
*G06F 3/0486* (2013.01)

(52) U.S. Cl.
CPC .......... *G06F 17/241* (2013.01); *G06F 3/0486* (2013.01)

(58) Field of Classification Search
CPC .............. G06F 17/241; H04N 1/32128; H04N 2201/3225
See application file for complete search history.

(56) References Cited

U.S. PATENT DOCUMENTS

| | | | | |
|---|---|---|---|---|
| 6,230,169 | B1* | 5/2001 | Nagae ........................... | 715/203 |
| 7,962,846 | B2* | 6/2011 | Lerner et al. ................. | 715/230 |
| 2003/0147099 | A1* | 8/2003 | Heimendinger et al. ..... | 358/462 |
| 2009/0164899 | A1* | 6/2009 | Hernacki et al. ............. | 715/709 |
| 2009/0187817 | A1* | 7/2009 | Ivashin et al. ................ | 715/230 |
| 2010/0036967 | A1* | 2/2010 | Caine et al. ................... | 709/236 |
| 2011/0022942 | A1* | 1/2011 | Flemings et al. ............. | 715/230 |
| 2011/0078560 | A1* | 3/2011 | Weeldreyer et al. ......... | 715/255 |
| 2012/0159391 | A1* | 6/2012 | Berry et al. ................... | 715/823 |
| 2012/0331418 | A1* | 12/2012 | Bonforte ....................... | 715/784 |
| 2013/0054636 | A1* | 2/2013 | Tang ............................. | 707/769 |
| 2013/0124980 | A1* | 5/2013 | Hudson et al. ............... | 715/243 |
| 2013/0249783 | A1* | 9/2013 | Sonntag ........................ | 345/156 |
| 2014/0016910 | A1* | 1/2014 | Yu et al. ....................... | 386/234 |
| 2014/0236720 | A1* | 8/2014 | Shunock et al. ........... | 705/14.54 |
| 2014/0298153 | A1* | 10/2014 | Tsujimoto et al. ........... | 715/232 |
| 2014/0359446 | A1* | 12/2014 | McIntosh et al. ............ | 715/716 |
| 2014/0372217 | A1* | 12/2014 | Seacat DeLuca et al. | 705/14.54 |

OTHER PUBLICATIONS

Wagstaff, Keith, "Love Something? Give it a 'Big Like' on Facebook Messenger", NBC Online News, First Published Jun. 13, 2014, 2 pgs., Downloaded from http://www.nbcnews.com/tech/social-media/love-something-give-it-big-facebook-messenger-n130451.

* cited by examiner

*Primary Examiner* — Stephen Hong
*Assistant Examiner* — Marshon Robinson
(74) *Attorney, Agent, or Firm* — Cooley LLP

(57) ABSTRACT

A machine has a processor and a memory with instructions executed by the processor to receive a regional annotation request for an image, where the regional annotation request is associated with a segment of the image. The position of the regional annotation request in the image is noted. An annotation prompt is supplied. An annotation about the segment of the image is recorded.

15 Claims, 5 Drawing Sheets

APPARATUS AND METHOD FOR SHARING REGIONAL ANNOTATIONS OF AN IMAGE

FIELD OF THE INVENTION

This invention relates generally to communications in digital computer networks. More particularly, this invention relates to techniques for sharing regional annotations of an image.

BACKGROUND OF THE INVENTION

Communications today are increasingly transpiring in digital networks. Messaging applications and social networks are preferred modes of communications for many people, especially young people. Thus, there is a need for improved techniques for quickly characterizing and sharing communications in digital networks.

SUMMARY OF THE INVENTION

A machine has a processor and a memory with instructions executed by the processor to receive a regional annotation request for an image, where the regional annotation request is associated with a segment of the image. The position of the regional annotation request in the image is noted. An annotation prompt is supplied. An annotation about the segment of the image is recorded.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
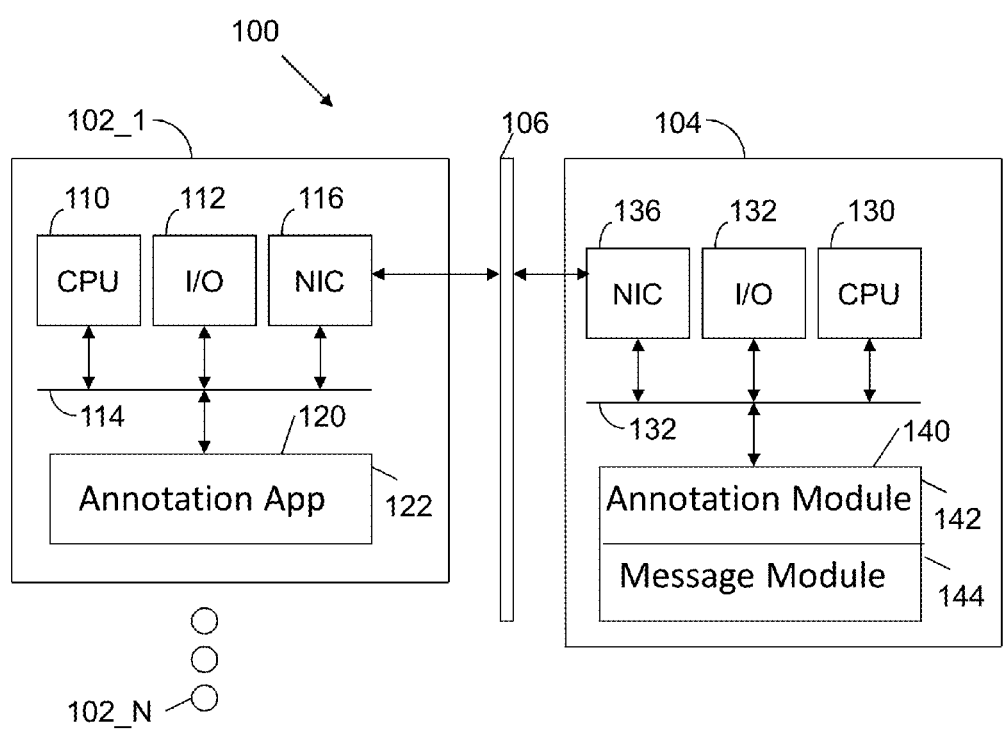
FIG. 1 illustrates a system configured in accordance with an embodiment of the invention.

FIG. 1 illustrates a system 100 configured in accordance with an embodiment of the invention. The system includes a set of client devices 102_1 through 102_N connected to a network 106, which may be any combination of wired and wireless networks. A server 104 is also connected to the network 106.

Each client device 102 includes standard components, such as a central processing unit 110 and input/output devices 112 linked by a bus 114. The input/output devices 112 may include a keyboard, mouse, touch display and the like. A network interface circuit (NIC) 116 is also connected to the bus to provide connectivity to network 106. A memory 120 is also connected to the bus 114. The memory 120 stores an annotation application 122 to facilitate operations of the invention. The annotation application 122 includes instructions executed by the central processing unit 110 to implement operations of the invention. In one embodiment, the annotation application 122 provides connectivity to server 104 and implements operations of the invention in conjunction with the server 104. In another embodiment, the annotation application 122 includes instructions to perform operations of the invention on the client device 102, after which the operations taken are communicated to the server 104 for further processing, such as recording the operations and distributing messages to other client devices. Each client device 102 may be a computer, tablet, mobile phone, game console, wearable device and the like.

The server 104 also includes standard components, such as a central processing unit 130, a bus 132, input/output devices 132 and a network interface circuit 136. A memory 140 is connected to the bus 132. The memory 140 stores instructions executed by the central processing unit 130 to implement operations of the invention. In one embodiment, the memory 140 stores an annotation module 142 with instructions to facilitate regional annotations of an image. The memory 140 also stores a message module 144 with instructions to coordinate the delivery of messages to various client devices 102 or to a social network feed.

Figure 2:
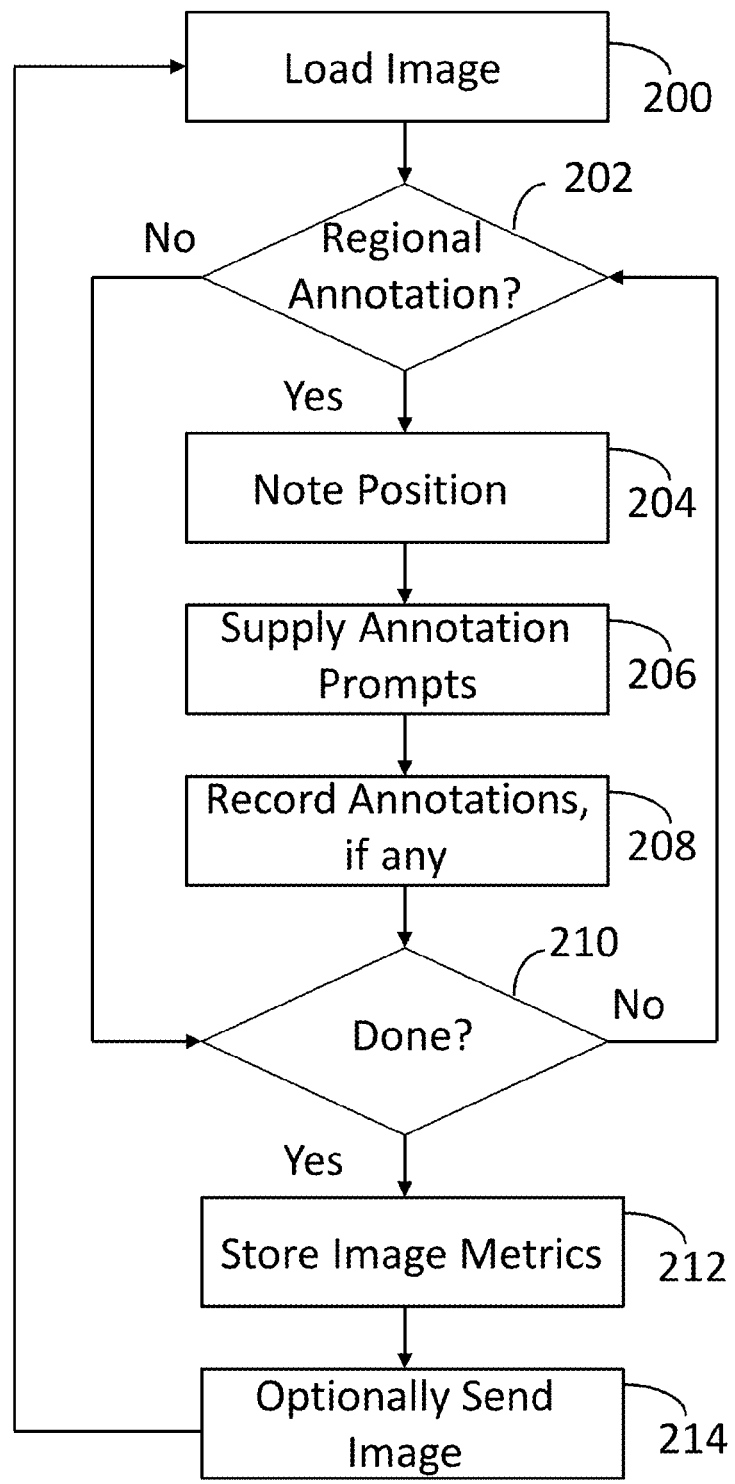
FIG. 2 illustrates processing operations associated with an embodiment of the invention.

FIG. 2 illustrates processing operations associated with an embodiment of the invention. The operations may be performed on server 104 or may be performed on both the client device 102 and server 104. Initially, an image is loaded 200. The image may be a photograph taken by the client device 102. Alternately, the image may be an image that appears on a newsfeed of a social network. Alternately, the image may be an image clipped from a web site. The image may be a frame of a video. The image may be served from server 104 or may be loaded locally from memory on client device 102.

While the image is loaded, the system waits for an indication of a regional annotation 202. A regional annotation is an expression of sentiment about a segment of the image. As demonstrated below, the regional annotation and the expression of sentiment may be captured in any number of ways. Embodiments of the invention facilitate quick and easy regional annotations. Consequently, the invention provides improved techniques for quickly characterizing and sharing communications in digital networks If a regional annotation is requested (202—Yes), the position of the request is noted 204. That is, the position of a segment of the image is noted. The position may be specified as a group of pixels on an X-Y grid. As discussed below, the position may correspond to a recognized object that has an associated set of pixels defining its location.

Annotation prompts 206 are then supplied 206. As demonstrated below, a variety of annotation prompts 206 may be used to easily characterize sentiment associated with a segment of the image. Annotations, if any, are recorded 208. If the user is done with the image (210—Yes) then image metrics are stored 212. The image metrics may include the position of the regional annotation request in the image and any annotation. The image metrics may also include a count of the likes or dislikes of the segment of the image. The image metrics may also include comments about the segment of the image and a count of the number of comments. A user may indicate that the user is done with the image by swiping the image or by pressing a "done" or similar icon.

Finally, the user may optionally send the image 214. For example, the user may be supplied with a "send" prompt. If the send prompt is engaged, a contact list may be supplied to the user. The user may select individuals on the contact list for receipt of the image with the associated annotations. The message module 144 may be used to coordinate these operations. The image may also be sent to a user's social media data feed. Control then returns to block 200.

Figure 3:
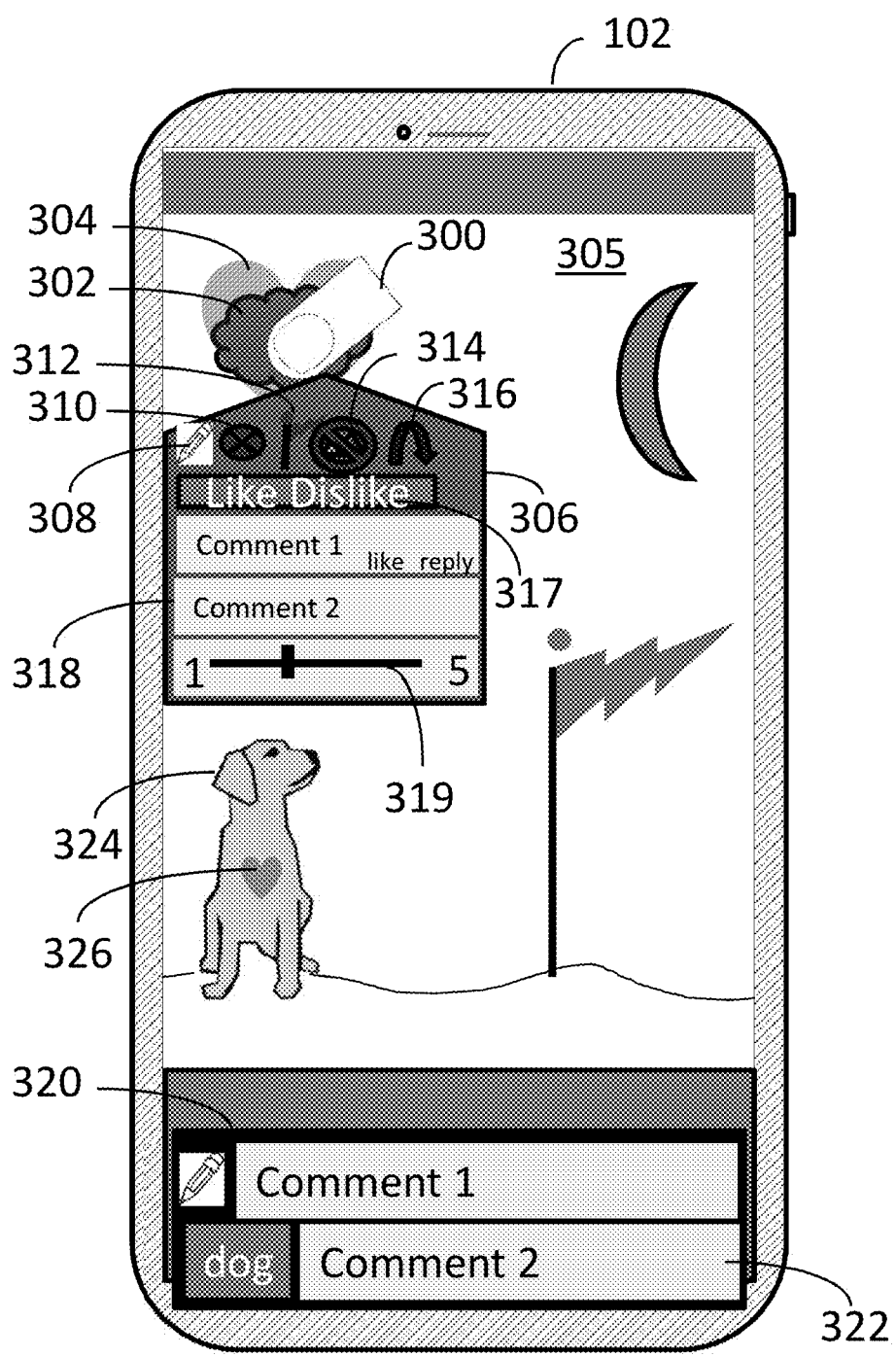
FIG. 3 illustrates regional annotations established in accordance with an embodiment of the invention.

FIG. 3 illustrates a client device 102 in the form of a mobile phone. A haptic gesture 300 to the display of the client device 102 is operative as a regional annotation request. In this case, the haptic gesture 300 is to a cloud 302, which is a segment of a larger image 305.

The haptic contact 300 with the segment of the image 302 is equated with sentiment about the segment of the image. In this example, the sentiment is reflected with a heart symbol 304. Naturally, other symbols may be used, such as a thumb up sign, smiley face, a star, etc. In one embodiment the length of continuous haptic contact with the segment of the image is equated to a strong sentiment about the segment of the image. For example, the size of the heart symbol 304 may grow as a function of the length of the continuous haptic contact. In this example, the haptic contact 300 operates as a regional annotation request and the growth of the heart symbol operates as an annotation prompt.

The annotation prompt may be more explicit in nature. For example, the annotation prompt may be a menu of annotation options 306. The menu 306 may include a number of options, such as an edit tool 308. The edit tool 308 may be used to draw on the image 305. A block comment tool 310 may also be supplied. The block comment tool 310 allows a user, perhaps the first individual to annotate the image, to preclude others from annotating the same segment of the image.

A flag tool 312 may be used to mark or flag a segment of the image. An icon 314 may notify a user that the menu of annotation options 306 is obstructing another regionally annotated segment of the image. The user may utilize options associated with this icon to reposition the menu 306 so the obstructed image may be viewed.

A send prompt 316 may be used to invoke a contact list that may be used to specify individuals that should receive the image and associated annotations. The send prompt may include options for posting on social network feeds.

The menu of annotation options 306 may also include a comment region 318. The comment region 318 may list comments from different observers of the image 305. The comment region 318 may be configured for scrolling access to comments.

The menu of annotation options 306 may also include a sentiment spectrum 319. In this embodiment, the sentiment spectrum 319 is a slider bar with strength of sentiment being on a numeric scale from weak sentiment (e.g., dislike) associated with a score of 1 to strong sentiment (e.g., really like) with a score of 5. Thus, an embodiment of the invention allows for numeric characterizations of sentiment about various segments of an image.

Finally, the menu of options 306 may include a like/dislike tag 317. Tapping the left side of the tag registers a like vote, while tapping the right side of the tag registers a dislike vote. A user may be limited to a single vote. Alternately, stronger sentiment may be collected by allowing multiple votes per user, with perhaps a cap on the number of votes. An unlike tag may also be provided to reverse a prior like vote.

Block 320 provides space for entering a comment using the edit tool 308. Alternately, tapping the block 320 may result in a keyboard being displayed, which may then be used to enter a comment.

In the example of FIG. 3, a previous comment 322 is available regarding the dog 324 in the image 305. A sentiment indicator 326 on the dog 324 signals that another has expressed sentiment about the segment of the image. The comment 322 has an associated indicator "dog". In one embodiment of the invention, the annotation module 142 uses machine reading to identify different objects in the image 305. This feature is more fully appreciated with reference to FIG. 4.

Figure 4:
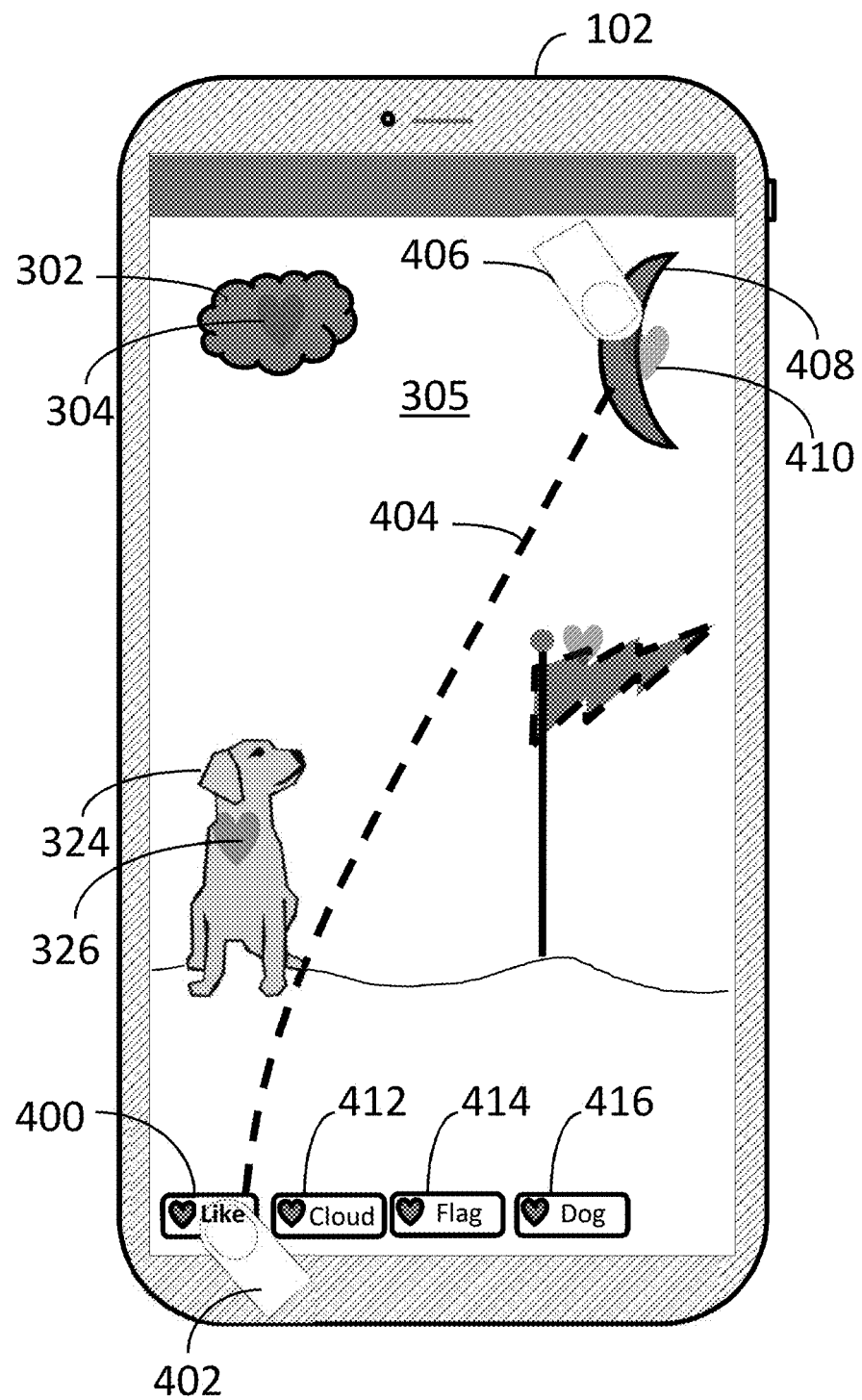
FIG. 4 illustrates alternate regional annotations established in accordance with an embodiment of the invention.

FIG. 4 illustrates the same image 305. The cloud 302 includes a sentiment indicator 304 produced by the operations discussed in connection with FIG. 3. The figure also illustrates a sentiment tag 400. The sentiment tag 400 may receive haptic contact 402. The haptic contact 402 may then be used with a drag motion 404 and a drop motion 406 on the segment of the image 408 with the moon feature. This results in a segment indicator 410 being displayed in connection with the segment of the image 408. Thus, a drag-and-drop sentiment tag 400 may be used in accordance with another embodiment of the invention.

Further observe in FIG. 4 that the machine reading feature of the annotation module 142 has tagged elements of the FIG. 305. In particular, there is an indicator for a cloud 412, a flag 414 and a dog 416. Those elements are plainly in view in the image 305, but they are now marked by the system. This may facilitate comments collection of segments of the image. For example, cloud tag 412 has a sentiment indicator in the form of a heart. A user may tap on the tag to see the comments associated with the cloud. A comment region such as 318 in FIG. 3 may be used in the event that a tag is engaged.

Figure 5:
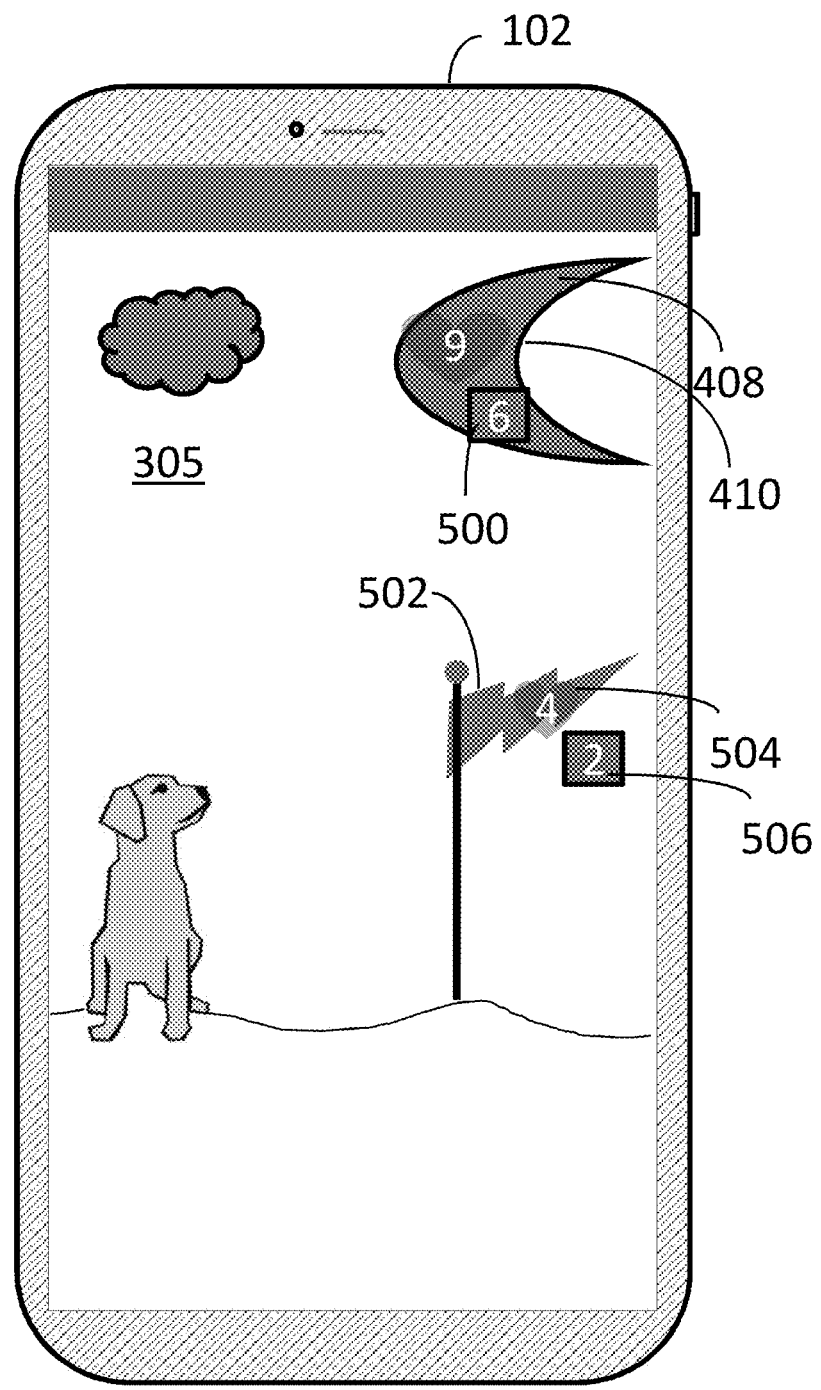
FIG. 5 illustrates regional annotation metrics supplied in accordance with an embodiment of the invention.

FIG. 5 illustrates another interface used in accordance with embodiment of the invention. In this example, sentiment region 410 is accompanied by numeric indicia of the number of likes that have been collected for the segment of the image. Comment indicia 500 may also be supplied to indicate the number of comments collected for the segment of the image. Similarly, flag 502 has associated sentiment region 504 with numeric indicia of the number of likes. The flag 502 also has associated comment indicia 506 to reflect the number of comments collected for the segment of the image. A user may tap on a sentiment region (e.g., 504) to increment the count. Tapping on comment indicia (e.g., 506) may result in the presentation of a comment region (e.g., 318 of FIG. 3).

The invention has been fully disclosed. The following discussion relates to various enhancements and alternate embodiments that may be used. The previously disclosed menu 306 may have a number of additional features. For example, in the case of the block comments prompt 312, a user may be allowed to specify individuals in a contact list that are allowed to comment on a segment of the image. The user may also specify the number of likable regions that may be designated in an image.

The annotation module 142 may operate in conjunction with the message module 144 to provide alerts to a user when a segment of an image is liked or commented upon. Thresholds may be set for alerts (e.g., send an alert for every 10 additional comments).

A toggle switch may be provided to turn off indicia of regional annotations so that an image may be viewed in its original form.

Those skilled in the art will appreciate that the disclosed techniques provide ways for multiple users to quickly express sentiments with respect to specific points in an image. These sentiments are easily shared as messages or postings in social networks. Disclosed embodiments allow for a single gesture expression of sentiment.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
   a processor; and
   a memory with instructions executed by the processor to:
      receive a regional annotation request for an image, wherein the regional annotation request is associated with a segment of the image;
      note the position of the regional annotation request in the image; and
      equate haptic contact with the segment of the image to a sentiment about the segment of the image, wherein the instructions to equate include instructions to equate the length of continuous haptic contact with the segment of the image to a strong sentiment about the segment of the image, wherein strong sentiment is a numeric characterization of sentiment on a sentiment spectrum.

2. The machine of claim 1 further comprising instructions executable by the processor to
   supply an annotation prompt; and
   record an annotation about the segment of the image.

3. The machine of claim 2 further comprising instructions executed by the processor to store image annotation metrics, wherein the image annotation metrics include the position of the regional annotation request in the image and the annotation.

4. The machine of claim 3 wherein the image annotation metrics include indicia of a number of likes of the segment of the image.

5. The machine of claim 3 wherein the image annotation metrics include indicia of a number of comments about the segment of the image.

6. The machine of claim 1 wherein the instructions to receive the regional annotation request include instructions to observe a drag of an icon and drop of the icon on the segment of the image.

7. The machine of claim 1 further comprising instructions executable by the processor to send the image and the annotation to a recipient.

8. The machine of claim 2 wherein the annotation prompt includes a word list.

9. The machine of claim 8 wherein the word list includes words associated with the segment of the image.

10. The machine of claim 8 wherein the word list includes words frequently used by a user.

11. The machine of claim 2 wherein the annotation prompt includes an edit tool.

12. The machine of claim 2 wherein the annotation prompt includes a slider bar sentiment spectrum.

13. The machine of claim 2 wherein the annotation prompt includes a comment control prompt to specify limitations associated with comments by others about the segment of the image.

14. The machine of claim 1 further comprising instructions executable by the processor to apply machine reading to the image to assign names to objects in the image.

15. The machine of claim 14 further comprising instructions executable by the processor to associate comments with the names.

* * * * *